(12) United States Patent
    Certain et al.

(10) Patent No.: US 11,119,998 B1
(45) Date of Patent: Sep. 14, 2021

(54) INDEX AND VIEW UPDATES IN A LEDGER-BASED DATABASE

(71) Applicant: Amazon Technologies, Inc., Seattle, WA (US)

(72) Inventors: Tate A. Certain, Seattle, WA (US); Yannis Papakonstantinou, La Jolla, CA (US); Allan Henry Vermeulen, Parksville (CA); Christopher Richard Jacques de Kadt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 16/200,595

(22) Filed: Nov. 26, 2018

(51) Int. Cl.
    *G06F 16/22* (2019.01)
    *G06F 16/23* (2019.01)

(52) U.S. Cl.
    CPC ...... *G06F 16/2272* (2019.01); *G06F 16/2282* (2019.01); *G06F 16/2365* (2019.01)

(58) Field of Classification Search
    CPC ................................. G06F 16/93; G06F 17/30
    USPC ................. 707/696, 704, 803, 812, E17.014
    See application file for complete search history.

(56) References Cited

U.S. PATENT DOCUMENTS

| | | | |
|---|---|---|---|
| 4,309,569 | A | 1/1982 | Merkle |
| 4,897,842 | A | 1/1990 | Herz et al. |
| 8,914,404 | B1 | 12/2014 | Kim et al. |
| 9,043,355 | B1 | 5/2015 | Kapoor et al. |
| 9,509,652 | B2 | 11/2016 | Ahn et al. |
| 2002/0010701 | A1 | 1/2002 | Kosciuszko et al. |
| 2006/0047713 | A1 | 3/2006 | Gornshtein et al. |
| 2010/0049715 | A1* | 2/2010 | Jacobsen ............ G06F 16/27 707/704 |
| 2011/0055201 | A1 | 3/2011 | Burger |
| 2015/0081623 | A1 | 3/2015 | Promhouse et al. |
| 2017/0048339 | A1 | 2/2017 | Straub |
| 2017/0075902 | A1 | 3/2017 | Hoffner et al. |
| 2017/0134260 | A1 | 5/2017 | Davidson |
| 2017/0250815 | A1 | 8/2017 | Cuende et al. |
| 2017/0272250 | A1 | 9/2017 | Kaliski, Jr. |
| 2017/0301047 | A1 | 10/2017 | Brown et al. |
| 2018/0075080 | A1 | 3/2018 | Hanai et al. |

(Continued)

FOREIGN PATENT DOCUMENTS

| | | |
|---|---|---|
| EP | 818743 A2 | 1/1998 |
| EP | 1164510 A2 | 12/2001 |
| WO | 2015187187 A1 | 12/2015 |

OTHER PUBLICATIONS

International Search Report and Written Opinion dated Feb. 26, 2020, in International Patent Application No. PCT/US2019/063103, filed Nov. 25, 2019.

(Continued)

*Primary Examiner* — Baoquoc N To
(74) *Attorney, Agent, or Firm* — Davis Wright & Tremaine LLP

(57) ABSTRACT

A database management system stores data for a table using a ledger which comprises journal and summary portions. A query processor of the database identifies a first set of operations to update a document of a table in accordance with an update command. The query processor identifies a second set of operations to update tables or views that are potentially affected by the update to the document. The query processor then causes the first and second sets of operations to be executed as an atomic unit.

20 Claims, 11 Drawing Sheets

(56) References Cited

U.S. PATENT DOCUMENTS

| | | | |
|---|---|---|---|
| 2018/0089041 A1 | 3/2018 | Smith et al. |
| 2018/0129711 A1 | 5/2018 | Richardson |
| 2018/0330349 A1 | 11/2018 | Uhr et al. |
| 2018/0331832 A1 | 11/2018 | Pulsifer |
| 2019/0004789 A1 | 1/2019 | Mills |
| 2019/0004974 A1 | 1/2019 | Chhabra et al. |
| 2019/0087600 A1 | 3/2019 | Sion et al. |
| 2019/0182047 A1 | 6/2019 | Andreina et al. |
| 2020/0007581 A1 | 1/2020 | Vouk et al. |
| 2020/0052884 A1 | 2/2020 | Tong et al. |
| 2020/0169412 A1 | 5/2020 | Certain et al. |

OTHER PUBLICATIONS

International Search Report and Written Opinion, dated Feb. 21, 2020, in International Patent Application No. PCT/US2019/063058, filed Nov. 25, 2019.
Wikipedia, "Merkle tree," Oct. 30, 2018, retrieved Feb. 11, 2020, from hilps://en.wikipedia.org/w/index.php?title=Merkle tree&oldid=866395282, 5 pages.
Haber et al., "How to Time-Stamp a Digital Document," The Journal of Cryptology 3(2):99-111, Jan. 1991.
Oberhaus, "Radioactive Material From Chernobyl Will Help Secure the Next Version of Zcash: How to use toxic waste to generate 'toxic waste,'" Feb. 14, 2018, retrieved Nov. 8, 2019 from https://www.vice.com/en_us/article/gy8yn7/power-tau-zcash-radioactive-toxic-waste, 5 pages.
Oberhaus, "The World's Oldest Blockchain Has Been Hiding in the New York Times Since 1995: This really gives a new meaning to the 'paper of record,'" Apr. 27, 2018, retrieved Nov. 7, 2019 from https://www.vice.com/en_us/article/j5nzx4/what-was-the-first-blockchain, 5 pages.
Oberhaus, "Watch This Hilarious Bitcoin Explainer Generated by an AI: Botnik strikes again with a short Bitcoin explainer made by a predictive text AI that was trained on other Bitcoin explainers," May 23, 2018, retrieved Nov. 7 from https://www.vice.com/en_us/article/xwmy9a/watch-botnik-ai-bitcoin-explainer, 4 pages.
Okrent, "The Public Editor; Paper of Record? No Way, No Reason, No Thanks," Apr. 25, 2004, retrieved Nov. 8, 2019 from https://www.nytimes.com/2004/04/25/weekinreview/the-public-editor-paper-of-record-no-way-no-reason-no-thanks.html, 4 pages.
Whitaker, "The Eureka Moment That Made Bitcoin Possible: A key insight for the technology came to a physicist almost three decades ago at a Friendly's restaurant in New Jersey," May 25, 2018, retrieved Nov. 8, 2019 from https://www/wsj.com/articles/the-eureka-moment-that-made-bitcoin-possible-1527268025, 4 pages.
Plattner, "A Common Database Approach for OLTP and OLAP Using an In-Memory Column Database," Proceedings of the 2009 ACM SIGMOD International Conference on Management of Data (SIGMOD '09), Jun. 29, 2009, 7 pages.

\* cited by examiner

INDEX AND VIEW UPDATES IN A LEDGER-BASED DATABASE

BACKGROUND

Database management systems provide facilities to store and retrieve data. Although a wide variety of database management systems exists, the most popular may be divided into one of two categories. The first category of databases, relational databases, are those built on the relational model and generally supporting tables of fixed-length records. The second category is non-relational databases which may substitute the comparatively rigid structured query language ("SQL") with other query mechanisms. Databases of both of these categories are widely used. However, database management systems in both categories have their own respective limitations.

BRIEF DESCRIPTION OF THE DRAWINGS

Various techniques will be described with reference to the drawings, in which.

DETAILED DESCRIPTION

Figure 1:
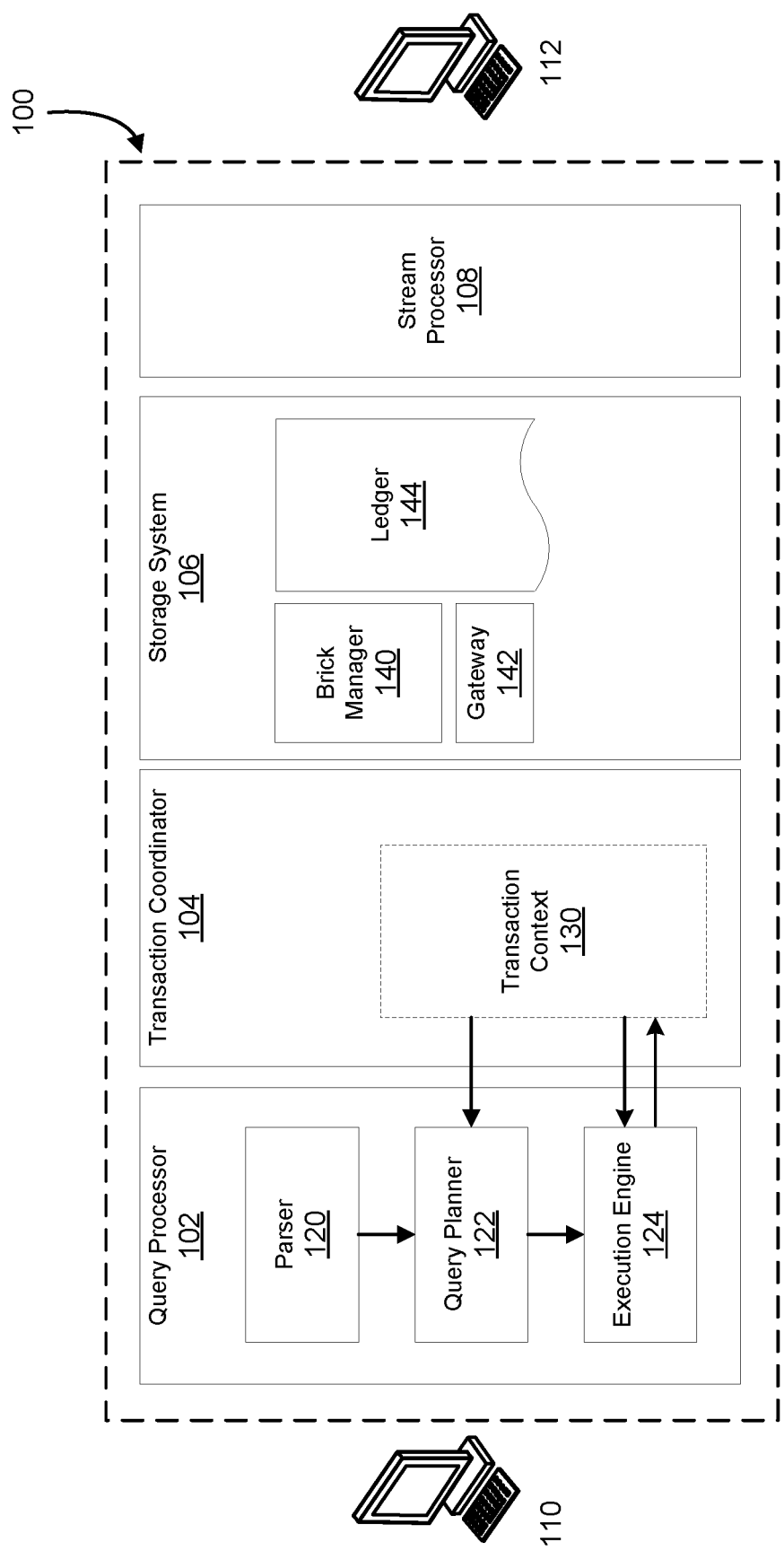
FIG. 1 illustrates a ledger-based database system, in accordance with an embodiment.

Described herein are systems and techniques related to the operation of a ledger-based database management system. A ledger, as used herein, comprises journal and summary data structures adapted for use in a database management system. A journal records an immutable history of transactions performed on a document managed by the system, and a summary provides a synopsis of the document's current state.

In an example embodiment, a ledger-based database management system receives a command to update a document stored in the table. Based on the command, the query processor of the database management system computes a set of write operations to apply to the journals and summaries that represent the affected table and that table's indexes and views. The set of write operations is then applied as an atomic unit, provided that serializability of the operations is confirmed. Moreover, a locking strategy for the update is based on an optimistic concurrency model. In embodiments, the set of write operations is computed, and serializability of the set of write operations is confirmed, and once confirmed, the set of write operations are applied. Embodiments may, for example, ensure that no write operations are committed unless the serializability of those operations is confirmed. In this manner, lock acquisition is avoided or at least minimized. In other embodiments, lock acquisition is deferred until after the set of write operations has been computed, rather than taken while the query processor generates the set of write operations. Either approach may be described as being in accordance with an optimistic concurrency model, since the majority of the operation occurs under the optimistic assumption that no conflicts will arise in between the time the write operations are computed and the time they are applied. In addition, the set of write operations is generated, in some embodiments, based on data available to the query processor without reference to the storage devices or computing nodes on which the table, index, and view data is stored. This aspect may further improve efficiency of the update process.

As used herein, a view is a table of documents defined in terms of a query language statement. In embodiments, views are read-only, and generally serve as performance optimizations. A given view can be pre-materialized and, as explained in more detail herein, stored in a summary data structure. As such, queries of views may be more efficient than a corresponding nested query.

As used herein, an index refers to a mechanism for improving the performance of a query. In embodiments, views are defined by submitting a data definition language ("DDL") statement that specifies a query or document attribute that is considered to be a worthwhile focus for an optimization. Once an index is defined, the system stores "index data" in a summary data structure, where the index data comprises information usable to optimize performance of a query.

In an example, a system comprises at least one processor and a memory that stores processor-executable instructions. When the instructions are executed by the processor, it causes the system to receive or otherwise obtain a command to update a document stored in a table managed by the system. The underlying storage mechanism of the table is a ledger, comprising journal and summary components. Execution of the instructions further causes the system to determine, by a query processor, a first set of write operations to apply to the table in order to update the document in accordance with the command. The system then identifies any indexes and views that may potentially be affected by applying the operations to the table. For example, a change to an attribute of a document might require a corresponding change to an index, or to a view that references the attribute. The system proceeds to determine, by the query processor, a second set of operations to apply to the indexes and views. The system then causes a transaction coordinator to apply the first and second set of operations, together, as an atomic unit. Performance of the system is optimized by deferring the acquisition of locks until needed by the transaction coordinator, and by generating the sets of write operations with little or no retrieval of data from the index, table, and view data storage structures.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. Embodiments are able to maintain consistent indexes and views with tables whose underlying storage mechanism is a ledger. Embodiments may offer improved update efficiency, wherein indexes and views are efficiently updated even when their underlying storage is distributed among many partitions.

FIG. 1 illustrates a ledger-based database system, in accordance with an embodiment. The example ledger-based database system 100 comprises a query processor 102, transaction coordinator 104, storage system 106, and stream processor 108. Note that although not explicitly depicted in FIG. 1, the ledger-based database system may be a distributed database system. For example, there may be multiple instances of the query processor 102, transaction coordinator 104, storage system 106, and/or stream processor 108. When distributed, the instances of these components may be divided or subdivided among a number of computing devices. In an embodiment, for example, the ledger 144 is a distributed ledger stored and maintained on a plurality of computing devices communicatively coupled to a plurality of storage devices.

A client device 110 may send queries to the database system 100. Here, a query refers to a request for information to be retrieved by the database system 100, expressed in accordance with a query language definition and a schema. For example, a query might be expressed in structured query language ("SQL"), or a variant thereof, and might further conform to the schema of a table referenced by the query. Schema refers to the names and structure of a table or other element, such as a view or index. A query that conforms to a schema refers to names and structures consistent with the schema. For example, the projection clause of a query may generally refer only to columns of a table that exist in the corresponding schema, except for special circumstances such as projection columns that are defined by the query itself.

A client device 112 may also access stream functions of the database system 100. Alternatively, various hosted services may access stream functions. Here, stream functions refers to features of the database system 100 that relate to direct and/or immediate access to a stream of transactions processed by, about to be processed by, or being processed by, the database system 100.

In an embodiment, a query processor 102 comprises a module operative on a computing device comprising at least one processor and a memory. As used herein, a module or sub-module refers to a portion of the memory in which processor-executable instructions are stored, where the instructions, when executed by the processor, cause the computing device to perform the functions attributed to the module. The query processor 102 performs functions related to processing queries received from the client device 110. The query processor 102 may comprise a parser 120, query planner 122, and execution engine 124. The database system 100 may comprise a fleet of query processors similar to the query processor 102 depicted in FIG. 1, to facilitate scaling.

In an embodiment, the parser 120 performs lexical and semantic analysis of a received query. This may include converting textual components of the received query to non-textual data structures, such as abstract syntax trees. It may further involve determining whether the query is syntactically valid, and valid with respect to any relevant schemas.

In an embodiment, the query planner 122 determines a plan for executing the received query. This may involve identifying various approaches to executing the query, estimating the costs of the various approaches, and selecting a plan believed by the query planner 122 to be most optimal. The query planner 122 may rely on various statistics, some of which may be provided by the storage system 106, regarding the amounts of relevant data stored by the storage system 106, how long it might take to scan or retrieve the relevant data, and so forth.

In an embodiment, the execution engine 124 obtains a plan for executing the query from the query planner 122, and executes the plan. Executing the plan may generally involve initiating scanning and retrieval of data, and assembling the results of the query. The execution engine, for example, may process a query by initiating a scan of a summary table or journal, or initiating some other operation, in order to retrieve data relevant to the query. The scanning and retrieval is performed by the storage system 106. The execution engine, in cases and embodiments, assembles the results of the query by performing join operations, filtering operations, and so on. The execution engine also applies a projection, as reflected in the original query and in the query plan. This step ensures that the assembled results conform to the expected schema.

In an embodiment, a transaction coordinator 104 comprises a module operative on a computing device comprising at least one processor and a memory. The transaction coordinator 104 can be co-located on a computing device with other modules, such as the query processor 102, or it may be located on a separate computing device. The database system 100 may comprise a fleet of transaction coordinators similar to the transaction coordinator 104 depicted in FIG. 1, to facilitate scaling.

The transaction coordinator manages query execution and command execution, to implement transactional properties such as atomicity, consistency, isolation, and durability. These are sometimes referred to as "ACID" properties. The transaction coordinator 104 communicates with the query processor 102 and storage system 106 to ensure that queries and command intended to be performed in a transaction context 130, are executed according to desired levels of ACID conformance.

In an embodiment, a storage system 106 comprises a module operative on a computing device comprising at least one processor and a memory. The storage system 106 can be co-located on a computing device with other modules, or located on a separate computing device. The database system 100 may comprise a fleet of storage systems similar to the storage system 106 depicted in FIG. 1, to facilitate scaling. The storage system 106 may comprise various sub-modules, including a brick manager 140, gateway 142, and ledger 144. Further aspects of these components of the storage system 106 are described herein. In general, the storage system 106 is responsible for performing storage and retrieval operations on the ledger 144.

In an embodiment, a stream processor 108 comprises a module operative on a computing device comprising at least one processor and a memory. The stream processor 108 can be co-located on a computing device with other modules, or located on a separate computing device. The database system 100 may comprise a fleet of stream processors similar to the stream processor 108 depicted in FIG. 1, to facilitate scaling. The stream processor 108 provides direct or immediate access to a stream of transactions processed by, about to be processed by, or being processed by, the database system 100. Various client devices and hosted client applications, such as the depicted client device 112, may access the stream of transactions and respond to the transactions as they occur.

Figure 2:
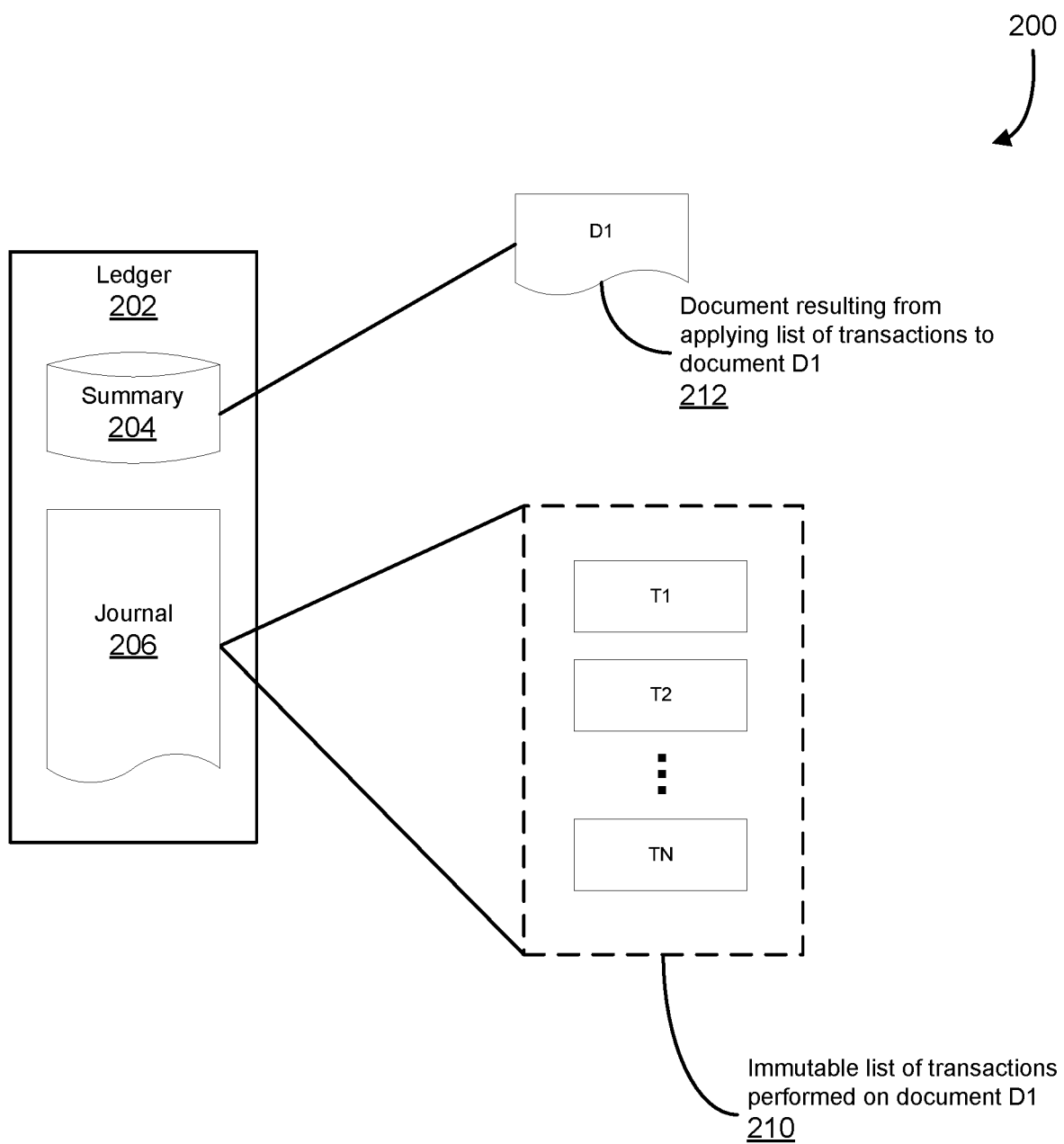
FIG. 2 illustrates distributed storage of a ledger used in conjunction with a ledger-based database system, in accordance with an embodiment.

The database system 100 of FIG. 1 is described as being ledger-based because it uses a ledger as its underlying storage structure. FIG. 2 illustrates distributed storage of a ledger used in conjunction with a ledger-based database system, in accordance with an embodiment. The ledger 202 of FIG. 2 may therefore correspond to the ledger 144 that FIG. 1 depicts.

The principal components of a ledger are one or more journals of immutable transactions, and a summary that reflects the results of those transactions. As depicted in the example 200 of FIG. 2, a ledger 202 comprises a journal 206 and a summary 204. The ledger 202 of FIG. 2 corresponds to the ledger 144 of FIG. 1.

The ledger 202 comprises a list of immutable transactions applied to documents or other data maintained by the database system 100. For example, the ledger 202 might comprises a list 210 of transactions performed on a document D1. The transactions are considered immutable because, once entered into the journal 206, they are neither changed nor deleted. The journal 206, in various embodiments, thus contains a complete and verifiable history of all changes made to the document D1.

The ledger 202 further comprises a summary 204. The summary 204 reflects the contents or state of each document stored in the database after applying all of the committed transactions, in order. For example, the summary 204 might contain the document 212 resulting from applying the list 210 of transactions applied to the document D1.

In various embodiments, the database system 100 supports queries of tables and views, and the use of indexes, in a manner that at least appears to the user to be similar to that of traditional relational database management systems. The database system 100, in various embodiments, provides a session-based transactional application programming interface ("API"). Through the interface, using a superset of SQL, client devices may interact with documents, tables, views, and indexes, despite the difference in the underlying storage structures.

Figure 3:
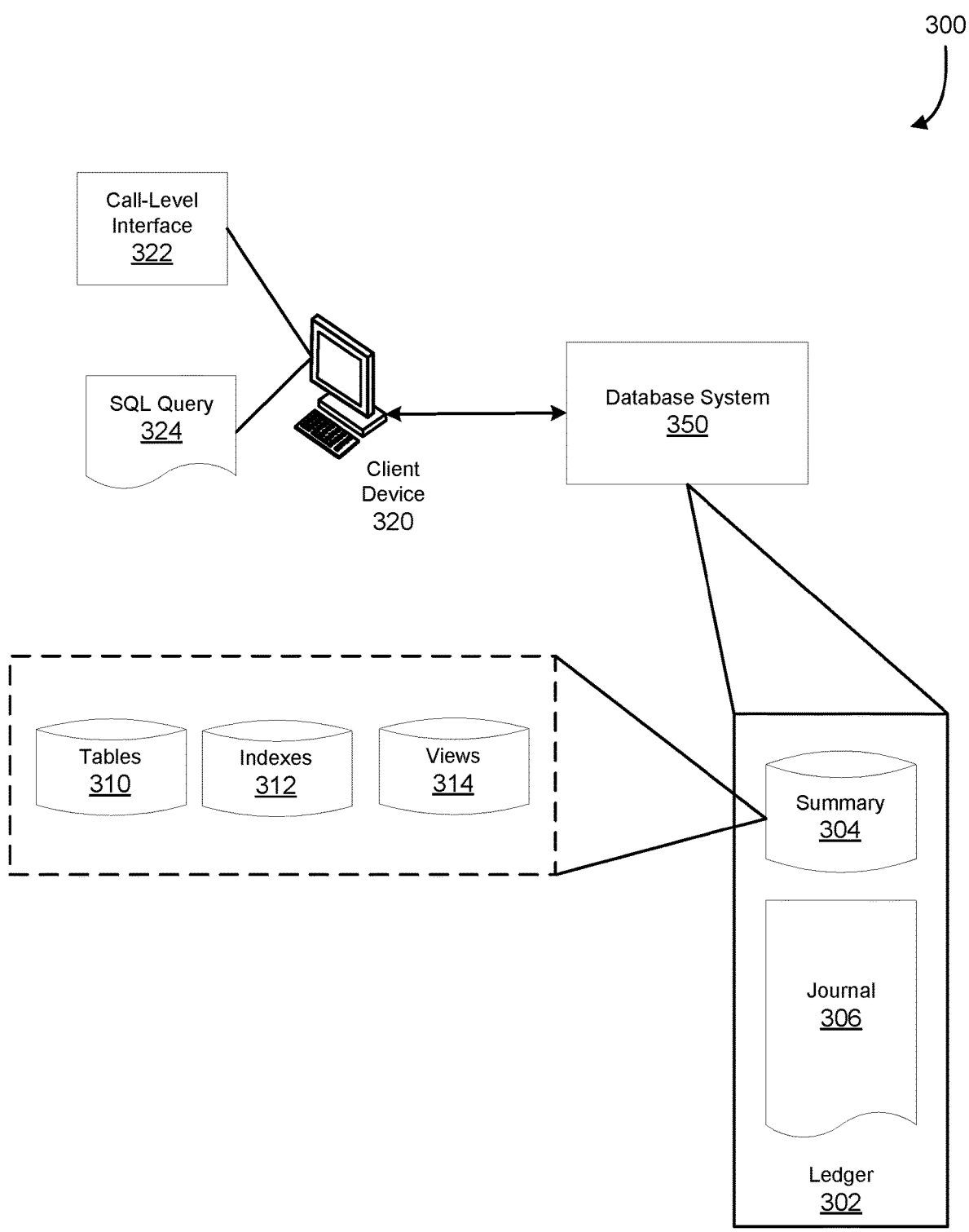
FIG. 3 illustrates aspects of query processing in a ledger-based database system, in accordance with an embodiment.

FIG. 3 illustrates aspects of query processing in a ledger-based database system, in accordance with an embodiment. In the example 300 of FIG. 3, the ledger 302, summary 304, and journal 306 may correspond to the ledger, summary, and journal depicted in FIG. 2.

In various embodiment, a client device 320, or more generally a client process, sends a SQL query 324 to a database system 350, using a call-level interface 322. The database system 350 depicted in FIG. 3 may correspond to the database system 100 depicted in FIG. 1. The call-level interface 322 can be an API for interacting with a database system, such as various available connectivity interfaces. The SQL queries 324 can be queries expressed in SQL, or a superset or subset thereof. Note, however, that the use of SQL in this example should not be construed so as to limit the scope of the present disclosure to embodiments which use SQL. Embodiments may use any of a wide variety of query languages.

The summary 304 stores data that represents the current state of the ledger's tables 310, indexes 312, and views 314. Aspects of storage techniques for the summary data are described below, regarding FIG. 7.

A query, such as the SQL query 324, can be processed in view of the data contained in the summary 304. For example, a query execution plan might rely on current data stored in the summary, such as index data, to efficiently execute a query. The query execution plan might further rely on current values for elements of a document when applying a projection.

Figure 4:
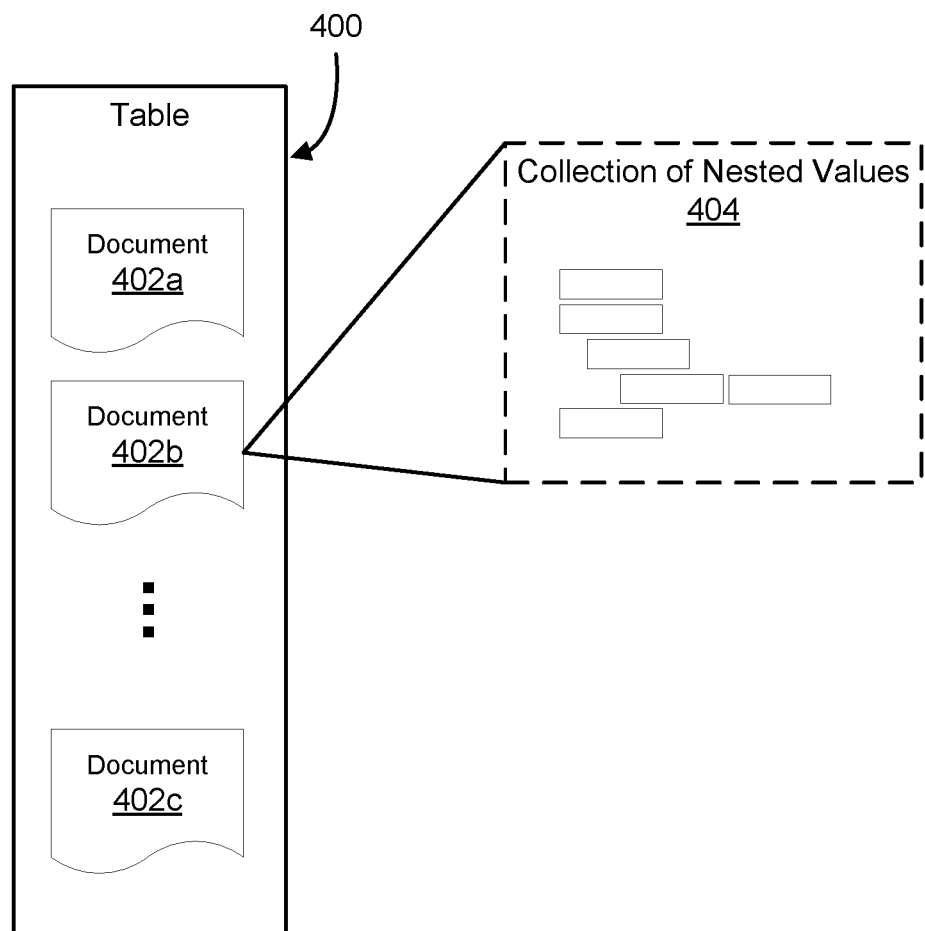
FIG. 4 illustrates a table structure of a ledger-based database system, in accordance with an embodiment.

The tables of the database system 100 are logically organized as collections of documents. FIG. 4 illustrates a table of a ledger-based database system, in accordance with an embodiment. As depicted by FIG. 4, a table 400 comprises a collection of documents 402a-c. A document 402 might also be described as a row of the table. However, in various embodiments, each document can comprise a collection of nested values 404. Accordingly, embodiments may support more loosely structured data than what is typically supported by conventional database management systems.

The example table 400 may generally be treated as a logical entity exposed to a client device via a query language, rather than a physical data storage structure. As described herein, the data for the table 400 is stored using a ledger comprising journal and summary portions.

Figure 5:
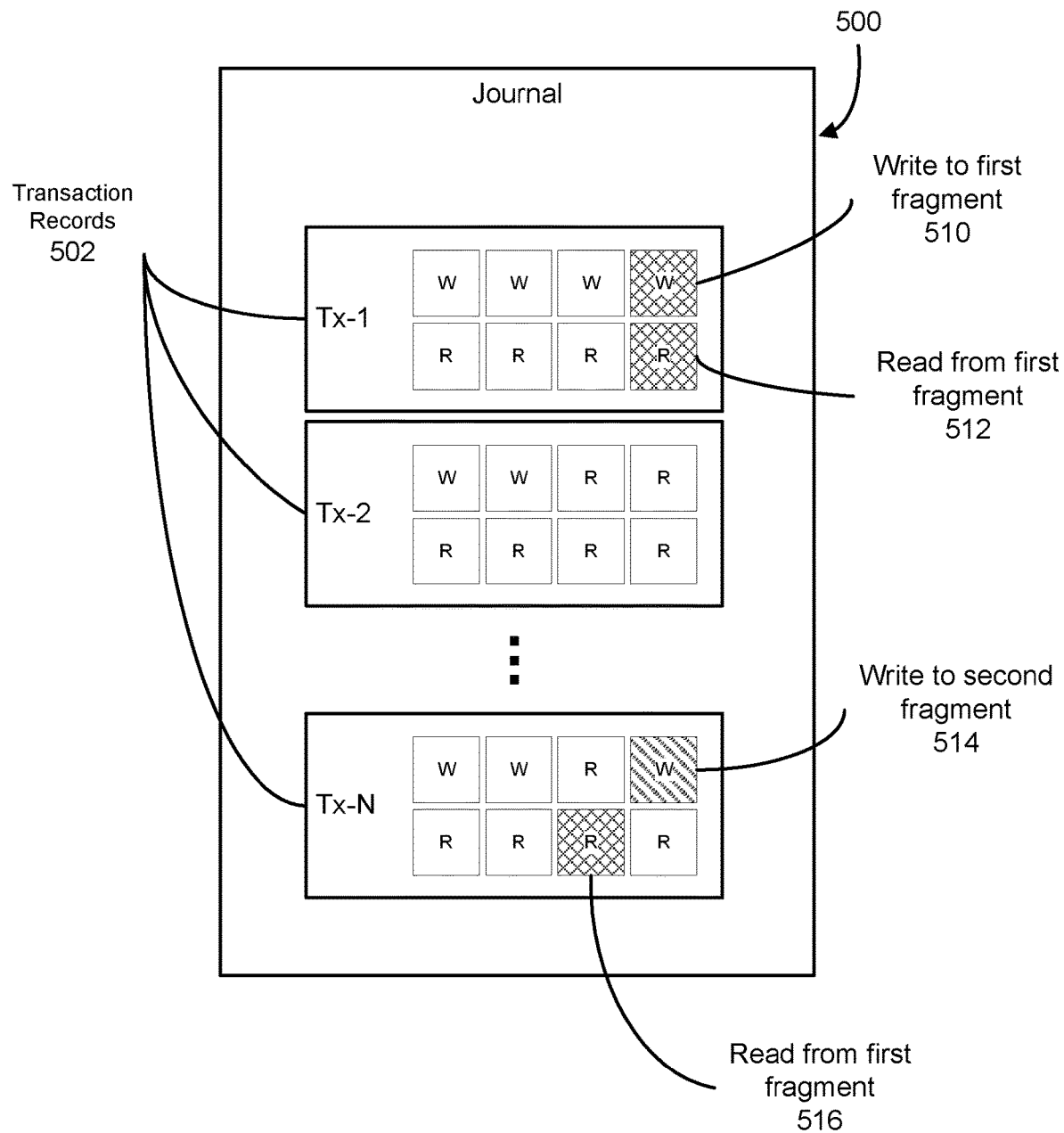
FIG. 5 illustrates a journal, in accordance with an embodiment.

FIG. 5 illustrates a journal, in accordance with an embodiment. In the example of FIG. 5, a journal 500 comprises an immutable, append-only list of transaction records 502. Each of the transaction records 502 comprises data indicative of a read or write operation to a document. There is at least one such chain, or sequence, of transactions for every document represented in the journal 500.

In an embodiment, such as the embodiment depicted in FIG. 5, the transaction records comprise data indicative of a data fragment associated with the read or write operation. For example, in FIG. 5, data is stored indicating that Tx-1 comprises a write to a first fragment 510 and a read from the first fragment 512. Likewise, transaction Tx-N comprises a write to a second fragment 514 and a read from the first fragment 516.

Figure 7:
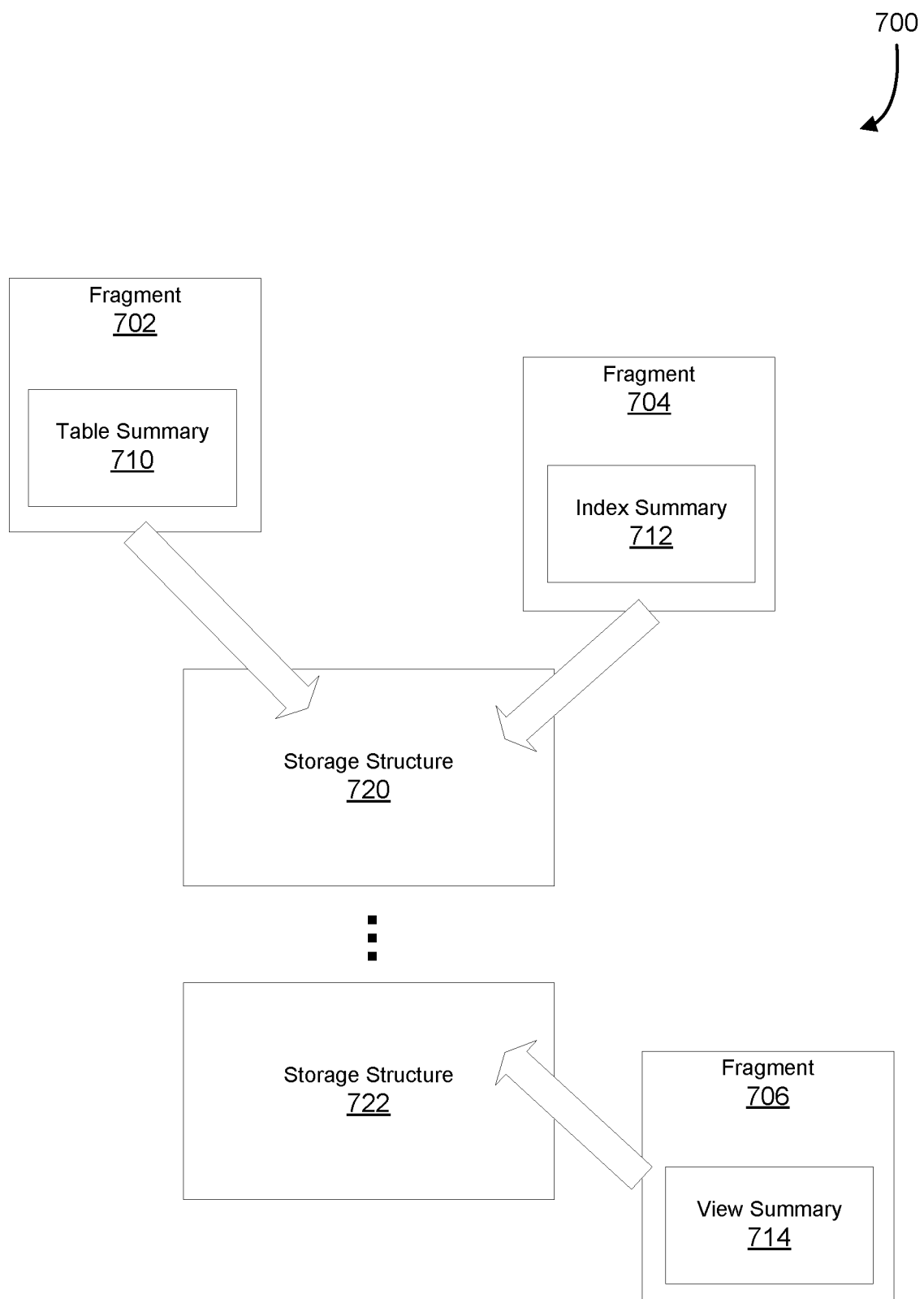
FIG. 7 illustrates aspects of a storage technique for summary data, in accordance with an embodiment.

More generally, the journal 500 comprises transaction records 502 which comprise data indicative of changes made both to a logical document and to the underlying storage structure for the journal. FIG. 7 describes aspects of the storage structure.

As depicted in FIG. 5, entries in the journal 500 are stored to reflect an immutable order, in the same sequence as the transactions were applied. For example, Tx-N represents the oldest transaction, Tx-2 the second most recent transaction, and Tx-1 the most recent. The journal 500 thus provides a complete history of the changes made to each document that is represented in the journal 500.

Figure 6:
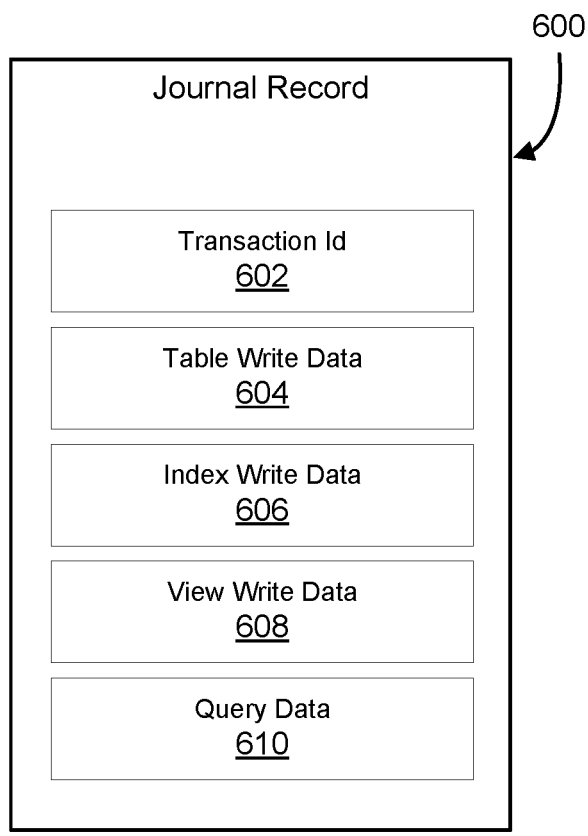
FIG. 6 illustrates aspects of a journal record, in accordance with an embodiment.

FIG. 6 illustrates aspects of a journal record, in accordance with an embodiment. In the example of FIG. 6, a journal record 600 describes various aspects of a transaction. In an embodiment, the journal record might correspond to or be an aspect of one of the transactions Tx-1, Tx-2, . . . Tx-N depicted in FIG. 5.

As depicted in FIG. 6, a journal record 600 comprises, in an embodiment, a transaction identifier 602. The transaction identifier 602 may be a sequence number, timestamp, cryptographic hash, and so forth. Note that in some embodiments, cryptographic techniques may be used to safeguard the integrity of the journal record 600 and the journal 500, including safeguards which ensure that the ordering of transactions is preserved. Embodiments may use transaction identifiers 602, or other data included in the journal record, as an aspect of these safeguards.

In an embodiment, the journal record 600 comprises table write data 604. The table write data represents modifications made to a table in the corresponding transaction. For example, the table write data 604 might represent changes made to any documents stored in a table as a result of the transaction.

In an embodiment, the journal record 600 comprises index write data 606. The index write data represents modifications made to an index as a consequence of the corresponding transaction. Likewise, in an embodiment, the journal record 600 comprises view write data 608, which represents modification made to a view as a consequence of the transaction.

In an embodiment, the journal record 600 comprises query data 610, representing a SQL command, query language command, or other command on which the transaction was based. This data may be stored for diagnostic purposes.

As described with reference to FIGS. 5 and 6, a journal record comprises, in various embodiments, references to storage fragments affected by a transaction. FIG. 7 illustrates aspects of a storage technique for summary data which utilizes storage fragments, in accordance with an embodiment.

As depicted in the example 700 of FIG. 7, a number of storage structures 720, 722 store fragments 702-706. As depicted in FIG. 7, each one of the fragments 702-706 resides on a single one of the storage structures 720, 722. In embodiments, each storage structure resides on a single storage node. A storage node comprises a computing device with at least one processor, a memory, and a storage device such as a flash driver, mechanical disk drive, network attached storage, and so forth. In other embodiments, a fragment may be divided among multiple storage nodes.

In various embodiments, a given fragment 702 of a summary is a set of records that are managed by the database system 100 as a unit. The summary is fragmented so that every record in a summary is in exactly one fragment. Each fragment contains only record summaries for any one table, index, or view. For example, a first fragment 702 might comprise data for a table summary 710, a second fragment 704 might comprise an index summary 712, and a third fragment might comprise a view summary 714. In some embodiments, each summary corresponds to exactly one fragment, although in other embodiments a summary may be split across fragments. A fragment is sized so that a large number of records can fit into a single fragment, but is not so large that the time required to do a full scan of the fragment is excessive.

A storage structure, such as any of the depicted storage structures 720, 722, comprises a data structure for storing data. Examples of such structures include, but are not limited to, B-trees, hash buckets, and heap trees. Suitable storage structures provide a scan capability, and may also provide filtering, scan-and-filter, and so forth.

In an embodiment, a given storage structure 720 may store multiple fragments. In other embodiments, a given storage structure 722 stores only a single fragment 706. In some embodiments, a given fragment is replicated to multiple storage structures.

Figure 8:
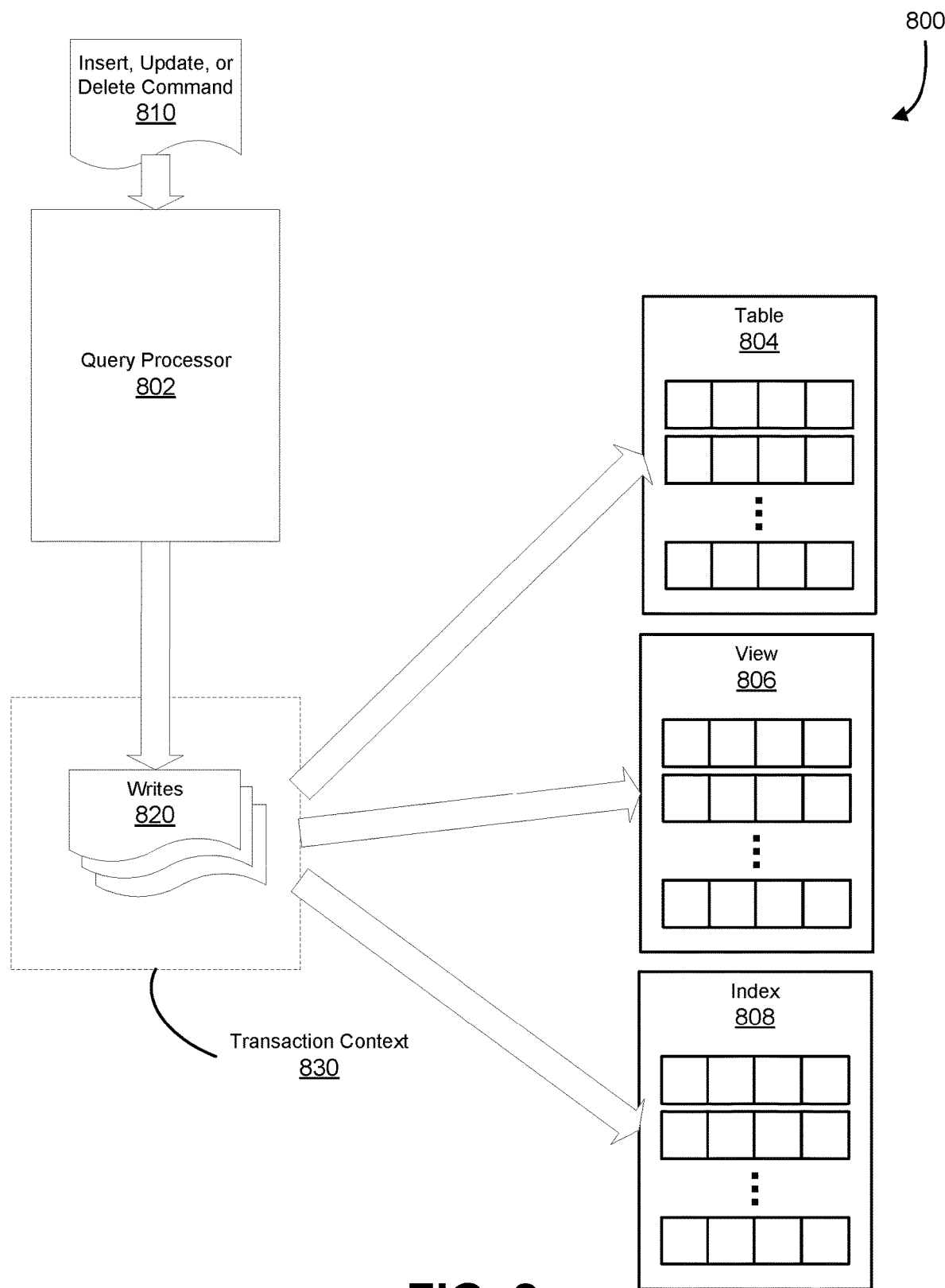
FIG. 8 illustrates updates to tables, indexes, and views in a ledger-based database system, in accordance with an embodiment.

FIG. 8 illustrates updates to tables, indexes, and views in a ledger-based database system, in accordance with an embodiment. Embodiments may be directed particularly to systems employing distributed ledgers, where the data maintained by the system is stored across a number of storage nodes. In such cases, there are challenges related to performing efficient updates, in view of issues such as retrieval latency, contention introduced by locking, and so forth. In the example 800 of FIG. 8, the illustrated technique employs an adapted optimistic concurrency model, sometimes referred to as optimistic concurrency control method or optimistic locking model, to update tables, indexes, and views.

As illustrated in FIG. 8, a query processor 802 receives and processes a command which comprises instructions to insert, update, or delete documents stored by the database. In embodiments, the command is a query language command, such as a SQL command, that comprises INSERT, UPDATE, or DELETE clauses. For clarity, the following discussion generally refers to the command affecting a single document, though it will be appreciated that many of the documents stored in a table may be inserted, updated, or deleted by a single command.

The database system identifies tables, documents, and document attributes (e.g., columns of a table) that would be potentially affected by execution of the command. For example, in various embodiments, the query processor 802 parsers the command 810 and performs a syntactic and lexical and syntactic analysis on the query to identify tables and document attributes that would potentially be affected by execution of the command. Note that the query processor 802 may not have access to the data necessary to determine precisely what documents might be affected. For example, an update command might specify that documents conforming to a criteria (e.g., documents having a "Sale Date" attribute older than a certain time) be updated. Precise determination of the affected records is therefore deferred and pushed down to the partition level. Thus, the precise set of affected documents might not be determined until each of a number of partitions has begun to apply the update.

The database system may further identify views and indexes that would be potentially affected by execution of the command. In various embodiments, the query processor 802 identifies affected views and indexes based on the aforementioned parsing, lexical analysis, and syntactic analysis of the command, and based on the tables, indexes, and views defined in the database's schema or catalog. For example, the query processor 802 might examine the schema or catalog and identify a set of views and/or indexes that reference a table or document attribute that is potentially affected by the update command. Some views or indexes might exclude or selectively include ranges of documents. The query processor 802 may, in some cases and embodiments, identify these ranges of potentially affected documents.

The database system then generates a set of write operations to perform on a table 804, view 806, and/or index 808. The example 800 of FIG. 8 illustrates tables, views and indexes in the singular, but it will be appreciated that the generated write operations 820 might pertain to a plurality of tables, indexes, and/or views.

Each write operation, of the depicted write operations 820, provides either instructions to insert, update, or delete data from a summary, or to append a record to a journal. To illustrate, assume that in the example 800 of FIG. 8 the command 810 is an update command which is intended to update an attribute $D_1.A_1$ of a document $D_1$ stored in a table 804. The query analyzer might determine that at least one document of the table 804 is to be updated. In response, the query analyze may generate a write operation to be applied to a journal, and a write operation to be sent to partitions containing summary data for the table 804. These write operation can comprise instructions to update a document according to the criteria specified by the original command, but may not identify the precise document, since the query processor 802 does not have direct accesses to the information required to make that determination.

Continuing the example, the query processor 802 may also generate write operations to be update affected views and indexes. Here too, the query processor 802 may be unable to identify the precise document to be affected, but instead specifies it according to the criteria provided in the original command. As with tables, these write operations, of the depicted write operations 820, may include instructions to append a record of the update to a journal of the affected table 804 and/or view 806, and/or instructions to update a summary of the affected table 804 and/or view 806.

The write operations 820 are applied to the various storage structures and storage nodes in a transaction context 830. The illustration of the transaction context 830 in FIG. 8 is intended to show that the write operations are executed as an atomic unit. In other words, either all of the writes operations 820 achieve their intended effect on the state of the document, or have no persistent effect on the state of the document. Thus, while attempts to write to the document might be recorded in a journal, they do not affect the state of the document unless committed, and none of the write operations 820 are committed unless all of the write operations 820 are committed.

As noted above, the database system employs an optimistic concurrency model when applying updates to tables, indexes, and views. The process is performed in accordance with an optimistic concurrency model by deferring, minimizing, or avoiding entirely the acquisition of locks on the data to be updated while the updates are computed. For example, in an embodiment, the updates are computed as described above, and then applied as an atomic operation. During the application, the serializability of the updates is determined. If any conflicts arise, the effects of the operation are rolled back. Determining the serializability comprises confirming that the outcome of a transaction has not been affected by an intervening transaction.

Figure 9:
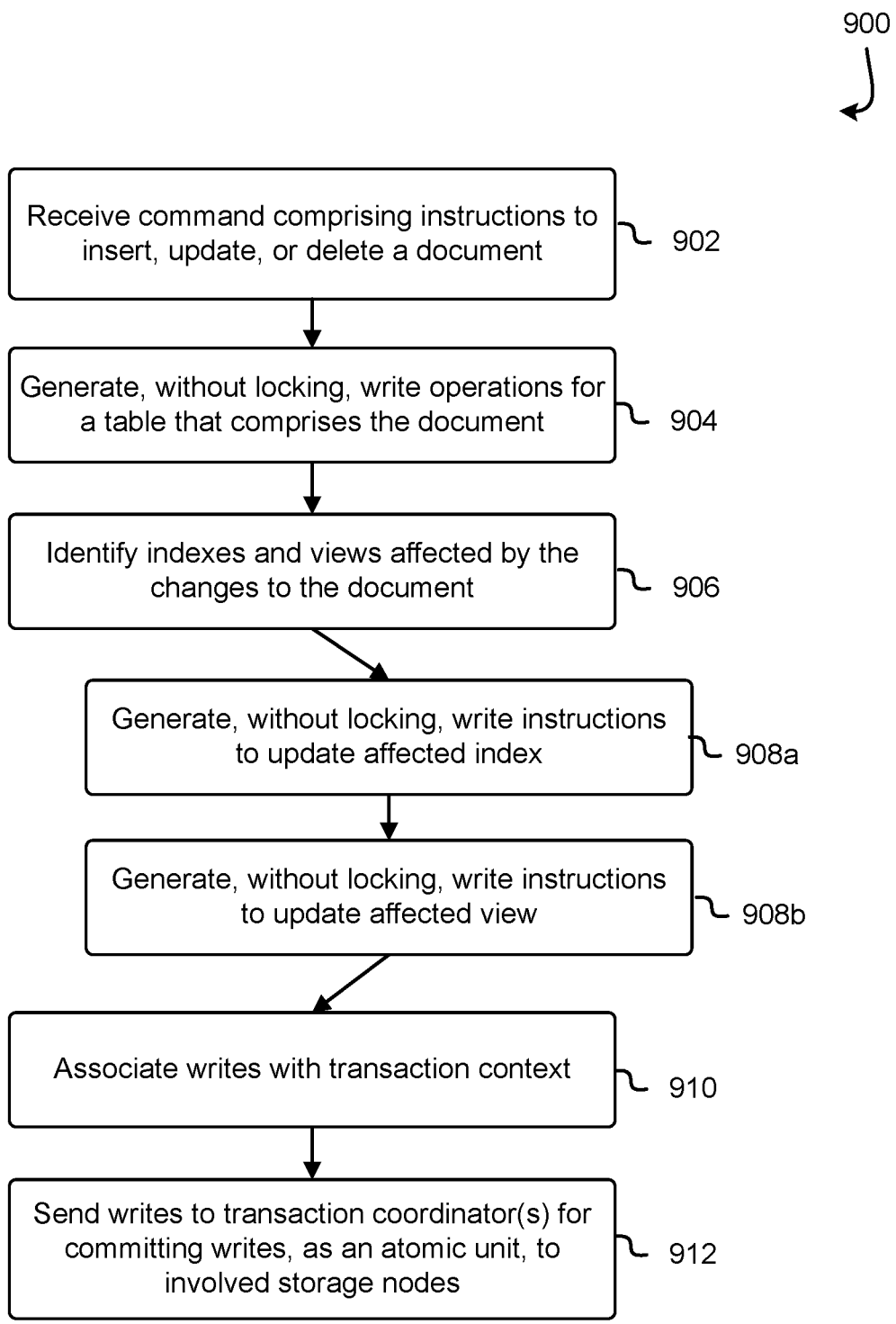
FIG. 9 illustrates a process for performing optimistic updates to indexes and views in a ledger-based database system, in accordance with an embodiment.

Aspects of what is illustrated by FIG. 8 may be further understood in view of FIG. 9, which illustrates a process for performing optimistic updates to indexes and views in a ledger-based database system, in accordance with an embodiment. Although the example 900 of FIG. 9 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 902, the query processor receives a command comprising instructions to insert, update, and/or delete a document of a table. In an embodiment, the query is first received via a call-level interface protocol, or a network protocol, and placed in a network buffer. The database management system reads the data for the query and invokes the query processor. Accordingly, receiving the command may comprise invoking a procedure, method, or function of the query processor. The command may comprise or correspond to a query language statement, such as a SQL language command or SQL language query that includes insert, update, or delete operations.

At 904, the query processor generates, without locking, write operations for a table that comprises the document. Here, the reference to locking refers to deferring the acquisition of locks on data and data structures that might need to be updated to complete processing of the command. An optimistic concurrency model is used. This approach may be better understood in view of a pessimistic locking model. In a pessimistic locking model, locks are acquired early in the transaction, such as when data is first read and the updates computed, and the locks are maintained until the transaction is either committed or rolled back. In contrast, with optimistic concurrency, locks are not acquired until needed to protect the integrity of data during the write phase. Moreover, as explained herein, embodiments may avoid the acquisition of locks during this phase by confirming the serializability of a transaction when the updates are applied during the commit phase.

The write operations are generated based on data available to the query processor, which in various embodiments may primarily comprise the command being executed and schema information, such as the name and composition of an affected table. In some cases and embodiments, information about the contents of partitions, such as the ranges of data stored on each partition, might also be available.

The write operations, as described regarding FIG. 8, provide instructions to update a journal and/or summary data structure. Regarding updates to a journal, a write operation could indicate the update to be applied and an include information regarding which document(s) the update should be applied to. This might particularly identify the document (s) to update applies to, or in some cases specify a range or other criteria usable to identify the targets of the update. A record of the change can then be appended to a journal, for any document or documents that were affected. Regarding updates to a summary, the write instructions can be similarly structured, but are directed to the fragment in which data for a table is stored.

At 906, the query processor identifies the indexes and views that may be affected by the change to the document. The affected views may be predicted based at least in part on the query and the schema of the index or view. The identification might also be described as a prediction, since in some cases it might be determined, once the underlying data is examined, that an index or view is not actually affected by the change. As described above regarding FIG. 8, the determination of which indexes or views are affected may be made with the limited data available to the query processor, and may therefore be made without full knowledge of the state of the underlying data. Accordingly, in cases and embodiments, a write operation may be directed to an index or view but, even when successfully applied to the index or view, does not result in a change to the data state of the index or view.

At 908*a* and 908*b*, the query processor generates, also without locking, write instructions to update an affected index and/or view. These generated based on a process similar to that used to generate write instructions for the associated table.

At 910, the query processor associates the writes with a transaction context. This step might be combined with other steps, but is depicted separately in FIG. 9 in order to more clearly illustrate the concepts involved. In particular, each of the write operations, including those directed to distinct data structures stored on separate devices, is executed within the context of a single atomic transaction.

At 912, the query processor sends the writes to a transaction coordinator for committing the write operations, as an atomic unit, to whatever storage nodes are involved. The writes operations are treated as an atomic unit because all of the write operations must succeed (even if the successful completion of the write operation doesn't end in any data alteration), or none of the write operations will result in a persistent change to the state of any affected documents or structures, including any tables, indexes, or views. This step is performed by a transaction coordinator, such as the transaction coordinator depicted in FIG. 1. In some embodiments, locks are acquired and subsequently released during this phase. Other embodiments may reduce, avoid, or eliminate the acquisition of locks during this phase by confirming the serializability of the operations when the updates are applied to the ledger. The serializability may therefore be confirmed by a transactions coordinator and storage system, individually or in combination.

Figure 10:
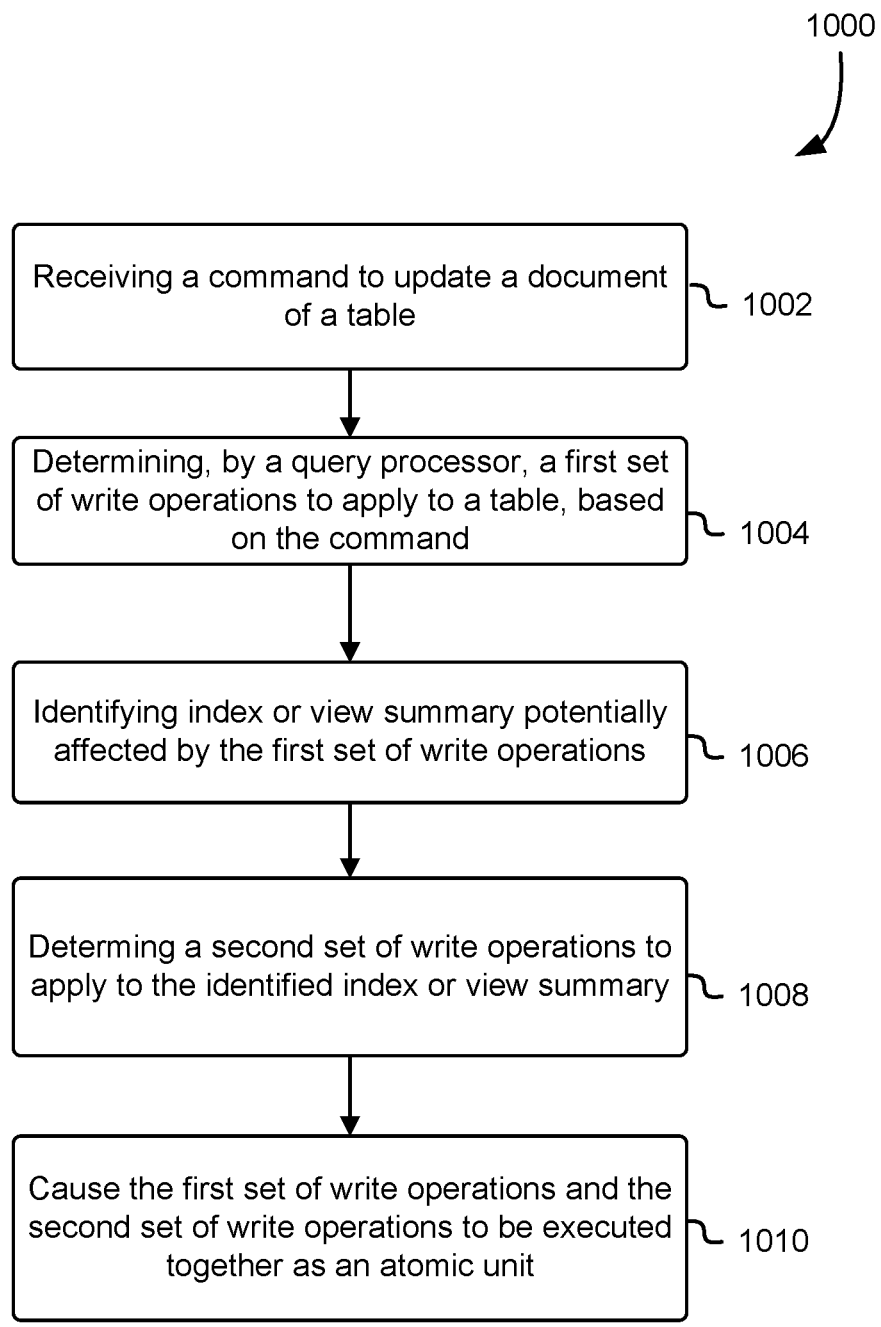
FIG. 10 illustrates a process for updating indexes and views in a ledger-based database system, in accordance with an embodiment.

FIG. 10 illustrates a process for updating indexes and views in a ledger-based database system, in accordance with an embodiment. Although the example 1000 of FIG. 10 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

Step 1002 depicts the database system receiving a command to update a document of a table. Here, the table is one stored by a database system such as the database system 100 that FIG. 1 depicts. The table is therefore stored using a ledger, where the ledger comprises a journal component and a summary components.

Step 1004 depicts determining, by a query processor of the system, a first set of write operations to apply to a table. The set of operations is determined based on the command, as explained above in conjunction with FIGS. 8 and 9. The operations may be to append data indicative of the update to the document to a journal, or to modify a summary of the table.

Step 1006 depicts identifying indexes or views that would be affected by the first set of write operations. As explained above in conjunction with FIGS. 8 and 9, the query processor may analyze the available information to determine what indexes or views are likely to be affected by performing the first set of write operations. In an embodiment, the identified tables or views would include any index or view which references the affected table. In other embodiments, the identified tables or views are those which reference the particular document attributes affected by the first set of write operations. In other embodiments, additional data, such as information describing the range of values represented by a partition, is used to identify the views or indexes that might be affected.

Step 1008 depicts determining a second set of write operations to apply to the indexes and views that would be affected by the first set of write operations. The operations may be to append data indicative of the update to the document to a journal, or to modify a summary of the table.

Step 1010 depicts causing the first set and the second set of operations to be executed together as an atomic unit. As described herein, atomic execution of the operations refers to processing the operations such that either all of the changes described by the first and second set of operations are committed, or none are. Moreover, as described herein, the serializability of the transaction may be confirmed during the application of the operations as an atomic unit, thereby avoiding the acquisition of locks at the earlier phases of the depicted process.

The write operations may be directed to a plurality of storage structures maintained on a plurality of storage devices. With reference to corresponding elements depicted in FIG. 7, a fragment, such as one of the depicted fragments 702-706, contains at least a portion of a summary for a table, index, or view, and is stored in one of the storage structures 720-722.

The storage structures 720 may be adapted to provide mechanisms for detecting the applicability of a write operation, and for determining whether or not the write operation succeeds. These operations may include confirming the serializability of the write operations. These mechanisms may be adapted for the types of data involved—for example, a storage structure for a geospatial database might have specialized facilities for determining whether writes are conflicting, or for determining whether or not a geospatial index has been affected by a change to a document. These mechanisms may be used during the commit phase to determine if a write operation is applicable to the partition to which it is directed, or if the write operation conflicts with a previously applied write.

Note that in some embodiments, locks might be acquired during step 1010, while the first and second sets of write operations are committed. If an error occurs during the commit, all changes associated with the write operations are reverted, on whichever partitions were involved, and the locks are released. Also note that the commit phase may be preceded by a prepare phase during which no locks are acquired. In other words, locks are not necessarily acquired at the beginning of the commit phase represented by step 1010.

The query processor may cause the first and second sets of operations to be performed as an atomic unit using the facilities of a transaction coordinator. An example of a transaction coordinator is depicted in FIG. 1. In various embodiments, a transaction coordinator orchestrates the application of the write operations to the various storage structures, ensures that no constraints are violated, checks that the assumptions of optimistic concurrency are maintained, and so forth. The assumptions of optimistic concurrency can include, for example, checking that the write operations would overwrite the actions of another transaction.

Figure 11:
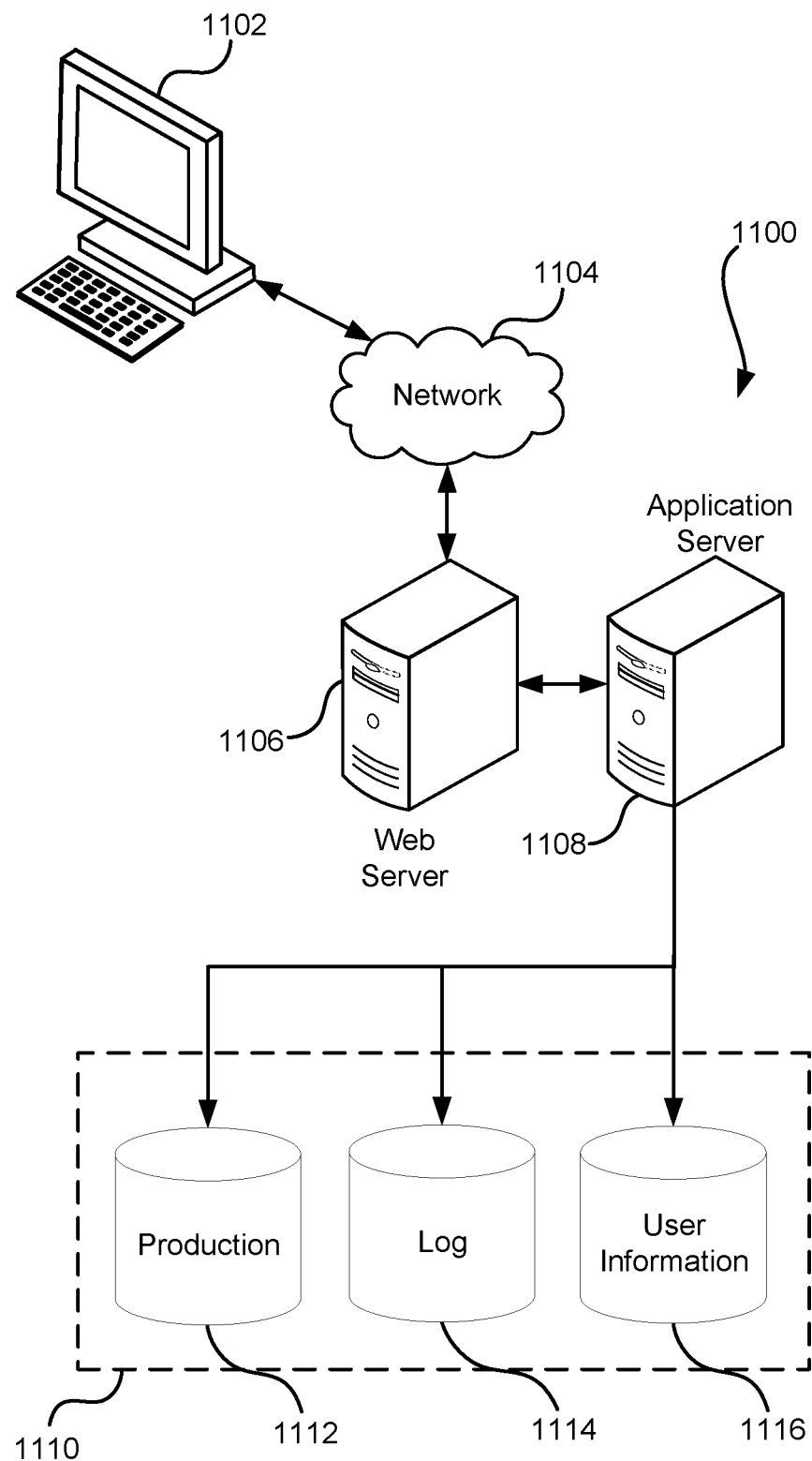
FIG. 11 illustrates a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies and other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto, and the application server 1108 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
at least one processor; and
at least one memory that stores processor-executable instructions that, in response to being executed by the at least one processor, cause the system to at least:
receive a command to update a document of a table;
generate, by a query processor, a first plurality of operations that, when performed, update the document in accordance with the command;
identify an index and a view that is potentially affected by the first plurality of operations;
determine, by the query processor, a second plurality of operations that, when performed, update the identified index and view; and
cause the first and second pluralities of operations to be applied as an atomic unit.

2. The system of claim 1, wherein the first and second pluralities of operations modify a plurality of storage structures on a plurality of storage devices.

3. The system of claim 1, wherein a transaction coordinator confirms serializability of the first and second plurality of operations during the application of the first and second pluralities of operations as an atomic unit.

4. The system of claim 1, wherein at least one of the first plurality of operations causes a journal entry to be appended to a journal of the table.

5. The system of claim 1, wherein the query processor provides the first and second pluralities of writes to a transaction coordinator.

6. A computer-implemented method, comprising:
determining, in response to a command to update a document of a table, a first plurality of operations to perform on the table, the first plurality of operations based at least in part on the command to update the document of the table;
identifying at least one of an index or a view associated with the first plurality of operations;
determining a second plurality of operations to perform on the identified at least one of the index or view; and
causing the first and second pluralities of operations to be applied as an atomic unit.

7. The computer-implemented method of claim 6, wherein the first plurality of operations comprises at least one operation to append, to a journal, a journal record indicative of an update to the document.

8. The computer-implemented method of claim 6, wherein the first plurality of operations comprises at least one operation to modify a summary of the table.

9. The computer-implemented method of claim 6, wherein the first and second pluralities of operations are applied to a plurality of storage structures on a plurality of storage devices.

10. The computer-implemented method of claim 6, wherein serializability of the first and second pluralities of operations are checked during application of the first and second operations, in accordance with an optimistic concurrency model.

11. The computer-implemented method of claim 6, wherein the second plurality of operations comprises an operation to append, to a journal, an entry indicative of an update to a view.

12. The computer-implemented method of claim 6, wherein a query processor provides the first and second pluralities of operations to a transaction coordinator for application.

13. The computer-implemented method of claim 6, where the table is stored as a ledger comprising at least one journal and at least one summary.

14. A non-transitory computer-readable storage medium having stored thereon executable instructions that, as a result of being executed by one or more processors of a computer system, cause the computer system to at least:
determine, in response to a command to update a document of a table, a first plurality of operations to apply to the table, the first plurality of operations based at least in part on the command to update the document of the table;
identify at least one of an index or a view associated with the first plurality of operations;
determine a second plurality of operations to apply to the at least one of the index or view; and
cause the first and second pluralities of operations to be applied as an atomic unit.

15. The non-transitory computer-readable storage medium of claim 14, wherein the executable instructions further comprise instructions that, as a result of being executed by the one or more processors, cause the computer system to at least retrieve, from a storage structure of a summary, information indicative of a conflict between at least one of the first and second pluralities of operations and a prior transaction.

16. The non-transitory computer-readable storage medium of claim 14, wherein the first plurality of operations comprises at least one operation to append data indicative of the update to the document to a journal.

17. The non-transitory computer-readable storage medium of claim 14, wherein the first plurality of operations comprises at least one operation to modify a summary of the table.

18. The non-transitory computer-readable storage medium of claim 14, wherein the first and second pluralities of operations are applied to a plurality of storage structures on a plurality of storage devices.

19. The non-transitory computer-readable storage medium of claim 14, wherein the first and second pluralities of operations are applied in accordance with optimistic concurrency.

20. The non-transitory computer-readable storage medium of claim 14, wherein data for the table is stored in at least one journal and at least one summary indicative of a sum of all transactions stored in the journal.

* * * * *